(12) United States Patent
Fryc et al.

(10) Patent No.: US 9,298,598 B2
(45) Date of Patent: Mar. 29, 2016

(54) AUTOMATED VISUAL TESTING (75) Inventors: Lukas Fryc, Brno (CZ); Pavel Tisnovsky, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 1139 days.

(21) Appl. No.: 12/728,949

(22) Filed: Mar. 22, 2010

(65) Prior Publication Data
US 2011/0231823 A1 Sep. 22, 2011

(51) Int. Cl.
*G06F 9/44* (2006.01)
*G06F 11/36* (2006.01)
*G06F 17/30* (2006.01)
*G06F 3/0484* (2013.01)

(52) U.S. Cl.
CPC ........ *G06F 11/3688* (2013.01); *G06F 3/04845* (2013.01); *G06F 17/30247* (2013.01)

(58) Field of Classification Search
CPC .......... G06F 11/3688; G06F 17/30247; G06F 3/04845
See application file for complete search history.

(56) References Cited

U.S. PATENT DOCUMENTS

| | | | | |
|---|---|---|---|---|
| 5,596,714 A * | 1/1997 | Connell | ............. | G06F 11/3688 714/38.1 |
| 5,668,897 A * | 9/1997 | Stolfo | ............... | G06F 17/30247 382/283 |
| 5,870,100 A * | 2/1999 | DeFreitas | ............... | G06T 11/40 345/441 |
| 6,226,407 B1 * | 5/2001 | Zabih et al. | ................... | 382/209 |
| 6,336,052 B1 * | 1/2002 | Ouellet | ............... | G06F 3/04845 345/649 |
| 6,944,795 B2 * | 9/2005 | Iline | ................................ | 714/39 |
| 7,975,215 B2 * | 7/2011 | Duncan et al. | ................ | 715/230 |
| 2003/0193565 A1 * | 10/2003 | Wen | ............................. | 348/184 |
| 2004/0096088 A1 * | 5/2004 | Kohle | ............................ | 382/128 |
| 2004/0208390 A1 * | 10/2004 | Jiang et al. | ..................... | 382/260 |
| 2006/0078223 A1 * | 4/2006 | Edwards | ............. | G06F 3/04845 382/283 |
| 2006/0085132 A1 * | 4/2006 | Sharma | ............... | G06F 11/3688 702/1 |
| 2006/0159347 A1 * | 7/2006 | Derks et al. | .................... | 382/218 |
| 2007/0290696 A1 * | 12/2007 | Majima et al. | ................ | 324/750 |
| 2008/0225057 A1 * | 9/2008 | Hertzfeld | ............. | G06F 3/04845 345/619 |
| 2010/0048993 A1 * | 2/2010 | Shidara | ......................... | 600/109 |
| 2010/0146488 A1 * | 6/2010 | Chen | ................. | G06F 17/30905 717/128 |
| 2010/0278440 A1 * | 11/2010 | Dragovich | ........... | G01N 23/046 382/218 |
| 2011/0047514 A1 * | 2/2011 | Butin et al. | .................... | 715/841 |
| 2011/0214107 A1 * | 9/2011 | Barmeir et al. | ................ | 717/125 |
| 2011/0262028 A1 * | 10/2011 | Lipson | .............. | G06F 17/30247 382/147 |
| 2011/0276946 A1 * | 11/2011 | Pletter | ................. | G06F 11/3688 717/124 |
| 2012/0269409 A1 * | 10/2012 | Olson et al. | ................... | 382/128 |

OTHER PUBLICATIONS

Gregory N. Schoenig et al, "Improved Detection of Strong Nonhomogeneities for STAP via Projection Statistics", [Online], 2005, pp. 1-6, [Retrieved from internet on Nov. 13, 2015], <http://ieeexplore.ieee.org/stamp/stamp.jsp?tp=&arnumber=1435920>.*

(Continued)

*Primary Examiner* — Thuy Dao
*Assistant Examiner* — Ziaul A Chowdhury
(74) *Attorney, Agent, or Firm* — Lowenstein Sandler LLP (57) ABSTRACT

Some embodiments of a system and a method to automate visual testing of an application have been presented. For instance, images generated by the application under test can be automatically captured. To reduce false positives in the automated visual testing, masks are applied onto the images to filter out some predetermined parts of the images. Then the masked images are compared with a set of predetermined patterns. Differences between the masked images and the predetermined patterns may be reported.

21 Claims, 5 Drawing Sheets

(56) References Cited

OTHER PUBLICATIONS

Juraj Húska, "Automated visual testing of web application", [Online], 2015, pp. 1-57, [Retrieved from Internet on Nov. 13, 2015], <http://is.muni.cz/th/359345/fi__m/thesis.pdf>.*

Kartik Mohanram et al., "Partial Error Masking to Reduce Soft Error Failure Rate in Logic Circuits", [Online], 2003, pp. 1-8, [Retrieved from Internet on Nov. 13, 2015], <http://ieeexplore.ieee.org/stamp/stamp.jsp?tp=&arnumber=1250141>.*

Abhinav Saxena et al., "Damage Propagation Modeling for Aircraft Engine Run-to-Failure Simulation", [Online], 2008, pp. 1-9, [Retrieved from Interent on Nov. 13, 2015], <.*

"Using the BootClasspath", accessed at: http://www.tedneward.com/files/Papers/BootClasspath/index.html on Mar. 2, 2010, 1 page.

"RichFaces—Open Source Rich JSF Components", accessed at: http://livedemo.exadel.com/richfaces-demo/index.jsp on Mar. 2, 2010, 1 page.

"Debian—Details of package perceptualdiff in sid", accessed at: http://packages.debian.org/sid/perceptualdiff on Mar. 2, 2010, 3 pages.

"Changing the way masks are applied", accessed at: http://livedocs.adobe.com/fireworks/8/fwhelp/08_lay29.htm on Mar. 2, 2010, 2 pages.

"Capturing screen shots of browsers with Selenium and Cloud Testing—Part 1—Cloud Testing Blog", accessed at: http://www.cloudtesting.com/blog/2009/06/24/capturing-screen-shots-of-browsers-with-selenium-and-cloud-testing-part-1/ on Mar. 8, 2010, last updated Jun. 24, 2009, 6 pages.

* cited by examiner

AUTOMATED VISUAL TESTING

TECHNICAL FIELD

Embodiments of the present invention relate to testing software applications, and more specifically to automating visual testing of software applications.

BACKGROUND

Conventionally, many software applications (or simply referred to as applications) generate graphical user interface (GUI) for various purposes, such as, to present information, to interact with users, etc. The use of GUI is particularly important for web applications. As such, to properly validate applications, the GUI of the applications has to be tested in addition to running other tests, like functional tests. Conventionally, manual visual testing is performed to ensure the GUI under test looks correct. For example, a software developer can eye-ball a screenshot of a GUI to see if the layout of the GUI and the content presented in the GUI are rendered as intended. However, such visual testing is repetitious and so error-prone. Moreover, the test result can be inconsistent if the eye-balling is performed by different people.

Currently, there are tools developed for visual testing, such as PerceptualDiff. In general, PerceptualDiff detects difference between two images, and it is focused on field of view, Gamma and luminance changes in the images. However, such existing visual testing tools are not well suited for visual testing of screenshots. One reason is that screenshots usually do not change field of view. Another reason is that screenshots typically do not change in Gamma and luminance when acquired on the same machine with the same display configuration. Therefore, such existing visual testing tools cannot effectively and accurately visually test applications.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of a method, an apparatus, and a system to automate visual testing of an application. As used herein, an application broadly refers to a set of one or more modules executable by a processing device, which is built or compiled from a set of instructions to perform one or more predetermined tasks or functions. In some embodiments, images generated by the application under test can be automatically captured. To reduce false positives in the automated visual testing, masks are applied onto the images to filter out some predetermined parts of the images. Then the masked images are compared with a set of predetermined patterns. Differences between the masked images and the predetermined patterns may be reported. Details of some embodiments of how to automate visual testing of an application are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "automating" or "filtering" or "stabilizing" or "comparing" or "capturing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 1:
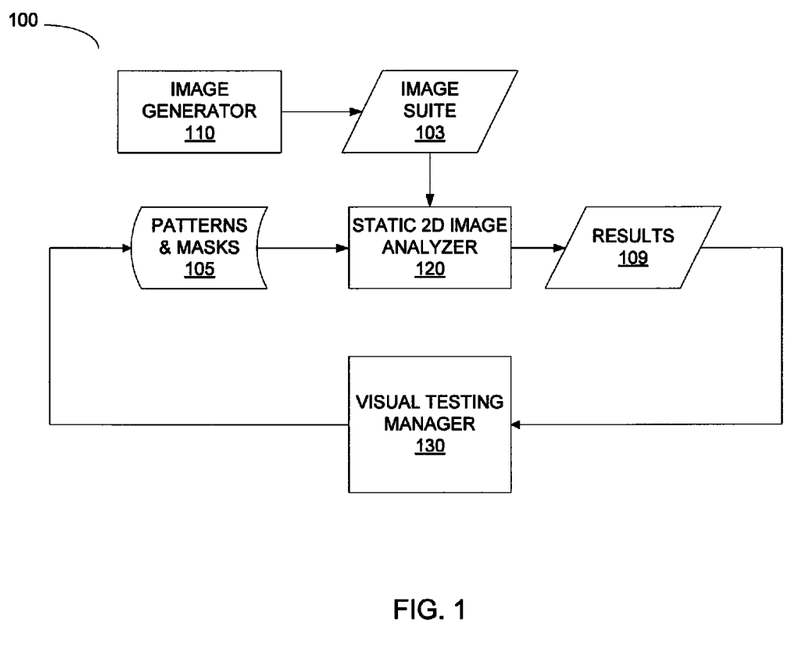
FIG. 1 illustrates one embodiment of an automated visual testing system usable in some embodiments of the invention.

FIG. 1 illustrates one embodiment of an automated visual testing system usable in some embodiments of the invention.

Figure 4:
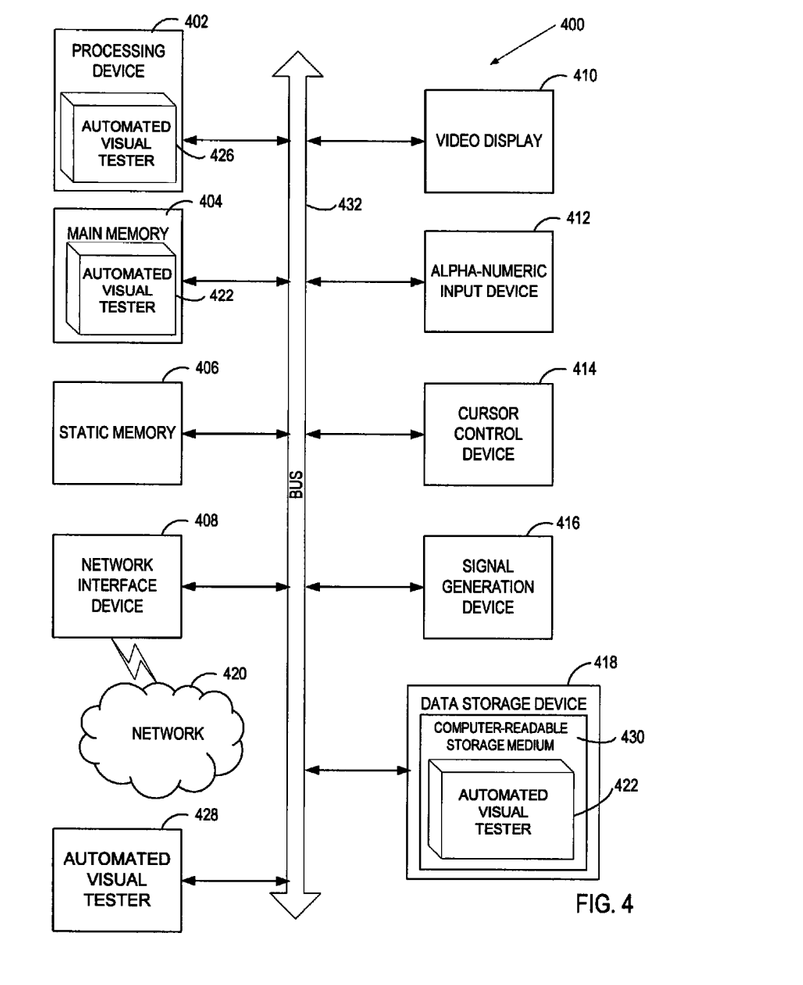
FIG. 4 illustrates a block diagram of an exemplary computing system.

The system 100 includes an image generator 110, a static two-dimensional (2D) image analyzer 120, and a visual testing manager 130. All or part of the system 100 may be implemented on one or more computing machines, such as a server, a desktop personal computer, a laptop computer, a personal digital assistant, etc. Details of one example of a computing machine are illustrated in FIG. 4. The image generator 110, the static 2D image analyzer 120, and the visual testing manager 130 are communicably coupled to each other via a bus system within a computing machine and/or via a network, such as, for example, a public network (e.g., the Internet), a private network (e.g., a local area network), a wireless network, a wire-lined network, etc.

Generally speaking, the image generator 110 captures images created by an application under test to produce an image suite 103. The image suite 103 is input to the static 2D image analyzer 120, which also receives a set of patterns 105 and masks 107. The static 2D image analyzer 120 analyzes the image suite 103 using the patterns 105 and masks 107. Broadly speaking, the patterns 105 as used herein include a set of one or more previously generated images substantially representing images that should be created by the application under test if the application under test functions correctly. The masks 107 as used herein broadly refers to one or more image coverings served to conceal one or more predetermined parts of an image, where the predetermined parts may or may not be fixed or exact. Then the static 2D image analyzer 120 outputs results 109 of the analysis, which may be provided to the visual testing manager 130. The visual testing manager 130 may report the results 109 to a user and take further action in response to instructions from the user. Using the above approach to analyze images created by the application, the system 100 can automate visual testing of the application. To further illustrate the above concept, some examples are discussed in greater details below.

In some embodiments, the images created by an application under test include graphical user interface (GUI) of the application. For example, a web application may create various GUIs to be rendered via a network access application, such as Windows® Internet Explorer® from Microsoft Corporation, Firefox from Mozilla Corporation, etc. The image generator 110 may include a screenshot capturing tool, such as Selenium, to capture screenshots of the network access application. The screenshots captured may be further analyzed as explained below. Furthermore, the image generator 110 may re-use functional tests of the application for automating the taking of screenshots. The collection of screenshots captured may be referred to as the image suite 103.

Generally speaking, the static 2D image analyzer 120 performs static analysis of the image suite 103 by comparing the images in the image suite 103 with the patterns 105, and then reporting the differences, if any, between them. In some embodiments, the static 2D image analyzer 120 employs perceptional statistics in comparing the images with the patterns 105. To evaluate the differences between them, the static 2D image analyzer 120 may determine how much a pixel in an image has changed both locally and in global measure. In addition, the clustering of changes in pixels of the image is also evaluated. The image may be accepted based on perception settings. For example, some variations of rendering may be acceptable if below a predetermined threshold.

However, lots of changes in the images of the image suite 103 may not be accepted using solely the above perception technique. In some cases, the images created by the application under test may vary for many reasons even when the application under test is functioning correctly. For example, a GUI created by the application under test may include time-variant information (e.g., current time and date), which changes over time even when the application functions correctly. Therefore, to reduce the number of false positives (or false hits), the static in automated visual testing 2D image analyzer 120 may use the masks 107 to filter out certain parts of the images. In some embodiments, the masks 107 may include 2 types of masks, namely, selective-alpha masks and ignore-bitmap masks.

In some embodiments, a selective-alpha mask defines an area in an image that should be disregarded in testing, such as time-variant data. Using an image editor, the image can be exported with alpha channel. The filled parts of the image will be disregarded in the result. Parts having full transparency may stay untouched. Then alignment of the image in an area of a current pattern to be compared with is defined. In one example, version-specific changes on each screenshot are identified and masked out. Then the background is hidden. Using an image editor, the image is exported. The exported image is aligned with the pattern to be compared with. Finally, the image and the pattern are compared to detect differences between the image and the pattern.

Figure 3:
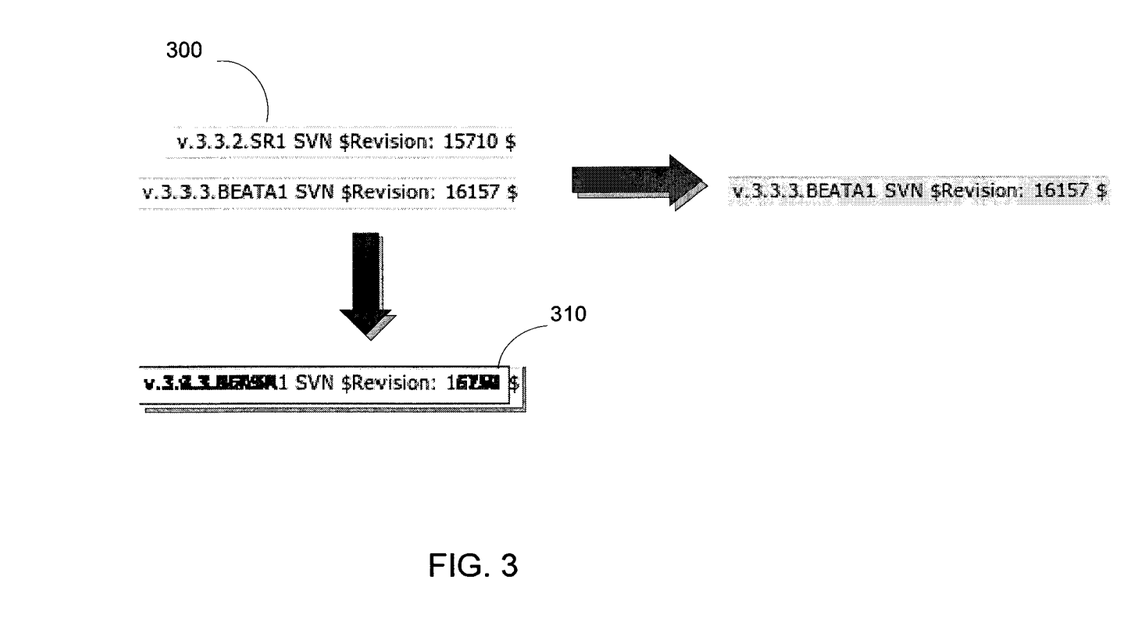
FIG. 3 illustrates one embodiment of an image generated by an application under test and one embodiment of the image filtered using an ignore-bitmap mask.

In some embodiments, ignore-bitmap masks are used to filter the image captured. In some screenshots, there are time-variant data that cannot be caught by defining an exact area. So, a cutout of the image area may be defined, which may be ignored on each pattern and/or snapshot. FIG. 3 illustrates one embodiment of an image 300 generated by an application under test and one embodiment of the image filtered 310 using an ignore-bitmap mask. As shown in FIG. 3, the version number and the revision number are masked in the filtered image 310 because the version number and the revision number are expected to be different from those in the patterns even when the application under test is functioning correctly.

When the above mask types do not cover changes in rendering, several original images may be defined, which can all be used as patterns for accepting newly taken images. Using one or more of the above filtering techniques, random data, and non-deterministic tests may still trigger false positives in the image comparison by the static 2D image analyzer 120. Therefore, test stabilization may be employed to further reduce false positives in the automated visual testing.

In some embodiments, test stabilization is applied to handle changes based on time-variant features in the application under test, such as time-based output and data randomizing. System methods and/or library features may be redefined without making changes to tested binaries. For instance, BootClassLoader may be used to accomplish this. In one example, java.util.Random is redefined to obtain not so random data. Likewise, other utilities that generate random data may be re-defined to output more predictable data. By applying test stabilization, automated visual testing can correctly ignore random data, non-deterministic tests, and time-variant data in the images being compared.

In some embodiments, the static 2D image analyzer 120 outputs results 109 of the analysis, which may be in the form of a test suite specific report, a hypertext markup language (HTML) report, etc. The results 109 may be input to the visual testing manager 130, which may report the results 109 to a user. For example, the visual testing manager 130 may generate a GUI to display the differences between an image of the image suite 103 and one of the patterns 105 side-by-side. The user may accept the difference manually (e.g., by actuating a user interface control, like a button, on the GUI), in which case, the visual testing manager 130 can add the image to the set of patterns 105 as a new pattern to be used in the future. Alternatively, the user may choose to replace the pattern compared with the image as another form of image accepting, or the user may simply reject the difference to mark test as negative.

Using the above approach, visual testing of software applications can be automated without generating too many false positives. As a result, the time spent on testing software applications can be greatly reduced. Furthermore, consistency and accuracy in the outcome of the visual testing of applications can be improved over conventional manual visual testing (i.e., by eye-balling images created by the applications under test).

Figure 2A:
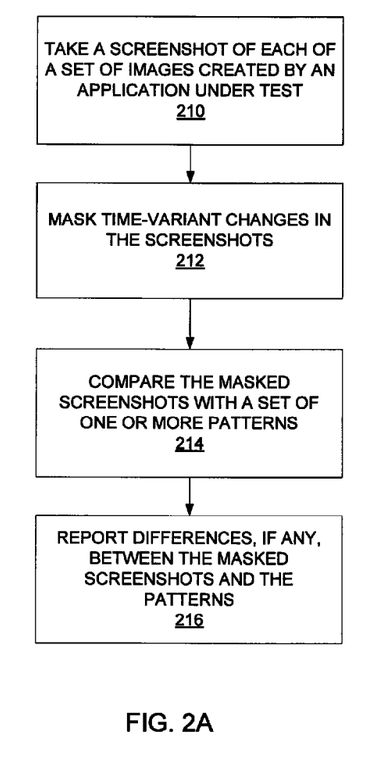
FIG. 2A illustrates a flow diagram of one embodiment of a method to automate visual testing of an application.

FIG. 2A illustrates a flow diagram of one embodiment of a method to automate visual testing of an application. The method may be performed by processing logic that may comprise hardware (e.g., circuitry, dedicated logic, programmable logic, microcode, etc.), software (such as instructions run on a processing device), firmware, or a combination thereof. For instance, the computing system 400 illustrated in FIG. 4 may perform at least part of the method in some embodiments.

Initially, processing logic takes a screenshot of each of a set of images generated by an application under test (processing block 210). Then processing logic masks time-variant changes in the screenshots (processing block 212). For example, processing logic may use one or more selective-alpha masks and ignore-bitmap masks to mask out the time-variant changes. Then processing logic compares the masked screenshots with a set of one or more patterns (processing block 214). The patterns are previously generated image substantially representing images that should be created by the application under test if functioning correctly. Finally, processing logic reports differences, if any, between the masked screenshots and the patterns (processing block 216). For instance, processing logic may output the differences in a report in a predetermined format (e.g., a HTML report), display or render the differences on a display device, etc.

Figure 2B:
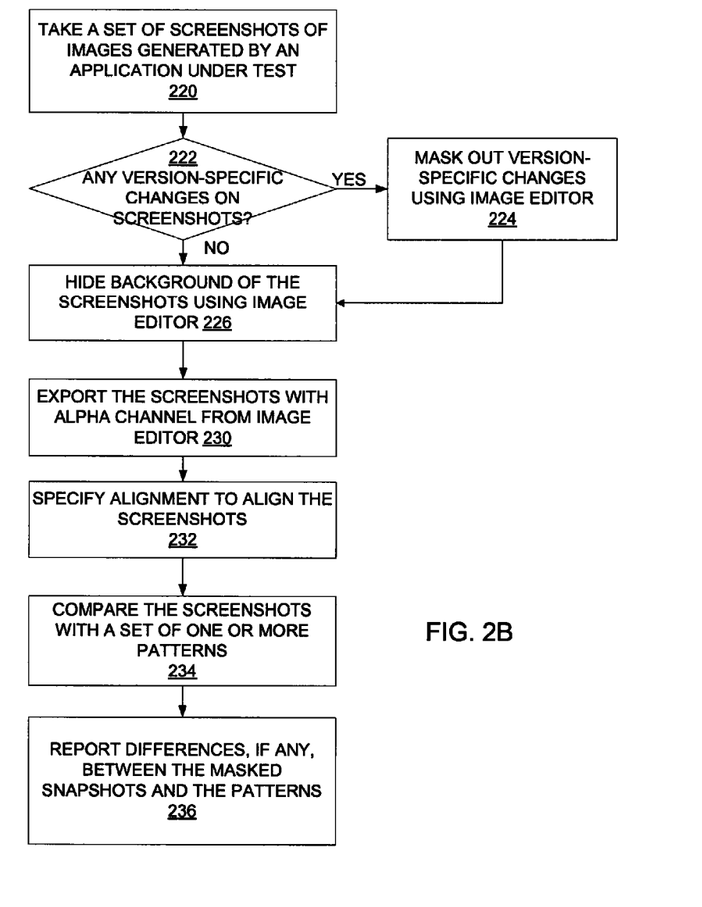
FIG. 2B illustrates a flow diagram of one embodiment of a method to perform visual testing of an application.

FIG. 2B illustrates a flow diagram of one embodiment of a method to perform visual testing of an application. At least part of the method may be performed by processing logic that may comprise hardware (e.g., circuitry, dedicated logic, programmable logic, microcode, etc.), software (such as instructions run on a processing device), firmware, or a combination thereof. For instance, the computing system 400 illustrated in FIG. 4 may perform at least part of the method in some embodiments.

Initially, processing logic takes a set of screenshots of images generated by an application under test (processing block 220). The screenshots may include images of a GUI of the application. Then a person running the test checks if there is any version-specific change (e.g., version number of the application under test) on the screenshots (processing block 222). This may be done in the phase of preparing test suite. If there are version-specific changes on the screenshots, then the person masks out these version-specific changes using an image editor (processing block 224) and then the method transitions to processing block 226. Otherwise, the person may hide background of the screenshots using the image editor (processing block 226).

In some embodiments, the person exports the screenshots with alpha channel from the image editor to be included in masks (processing block 230). Then the person can specify alignment to align the screenshots exported with a set of one or more patterns (processing block 232). As explained above, the patterns include a set of one or more previously generated images substantially representing images that should be created by the application under test if the application under test functions correctly. Then processing logic compares the screenshots with the patterns (processing block 234). Finally, processing logic reports differences, if any, between the screenshots and the patterns (processing block 236). For instance, processing logic may output the differences in a report in a predetermined format (e.g., a HTML report), display or render the differences on a display device, etc.

FIG. 4 illustrates a diagrammatic representation of a machine in the exemplary form of a computing system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 432.

Processing device 402 represents one or more general-purpose processing devices such as a microprocessing device, a central processing unit, or the like. More particularly, the processing device may be complex instruction set computing (CISC) microprocessing device, reduced instruction set computing (RISC) microprocessing device, very long instruction word (VLIW) microprocessing device, or processing device implementing other instruction sets, or processing devices implementing a combination of instruction sets. Processing device 402 may also be one or more special-purpose processing devices such as an application specific integrated circuit (ASIC), a field programmable gate array (FPGA), a digital signal processing device (DSP), network processing device, or the like. The processing device 402 is configured to execute the automated visual tester 426 for performing the operations and steps discussed herein.

The computing system 400 may further include a network interface device 408. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., automated visual tester 422) embodying any one or more of the methodologies or functions described herein. The automated visual tester 422 may also reside, completely or at least partially, within the main memory 404 and/or within the processing device 402 during execution thereof by the computing system 400, the main memory 404 and the processing device 402 also constituting computer-accessible storage media. The automated visual tester 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The automated visual tester 428, components and other features described herein (for example, in relation to FIG. 1) can be implemented as discrete hardware components or integrated into the functionalities of hardware components, such as ASICS, FPGAs, DSPs, or similar devices. In addition, the automated visual tester 428 can be implemented as firmware or functional circuitries within hardware devices. Further, the automated visual tester 428 can be implemented in any combination of hardware devices and software components.

Thus, some embodiments of a system and a method to automate visual testing of an application have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   generating, by a processing device, a screenshot of each of a plurality of images of a graphical user interface (GUI) of the application;
   masking, by the processing device, time-variant changes in the screenshot to generate a masked screenshot;
   comparing, by the processing device, the time-variant changes in the masked screenshot with a plurality of patterns comprising images previously generated by the application;
   in response to the comparing, rendering a difference between the masked screenshot and the plurality of patterns when the difference is below a threshold;
   determining whether there are version-specific changes on the screenshot;
   masking out the version-specific changes on the screenshot in response to a determination that there are version-specific changes; and
   hiding background of the screenshot in response to a determination that there are no version-specific changes.

2. The method of claim 1, wherein the masking comprises: applying an ignore-bitmap mask to the screenshot.

3. The method of claim 1, further comprising:
   applying a test stabilization to the application to cause the application to de-randomize data.

4. The method of claim 1, wherein the application is non-deterministic, and the method further comprises:
   applying a test stabilization to make the application determinable.

5. The method of claim 1, further comprising:
   allowing a user to accept the masked screenshot different from the plurality of patterns; and
   adding the masked screenshot to the plurality of patterns as a new pattern in response to the user accepting the masked screenshot.

6. The method of claim 1, further comprising:
   presenting to a user the masked screenshot, a pattern of the plurality of patterns, and the difference between the masked screenshot and the pattern; and
   replacing the pattern with the masked screenshot in response to an instruction from the user.

7. The method of claim 1 wherein the masking filters out a plurality of parts of each of the plurality of images.

8. An apparatus comprising:
   a memory and;
   a processing device, operatively coupled to the memory, to:
   generate a screenshot of each of a plurality of images of a graphical user interface (GUI) of the application;
   mask time-variant changes in the screenshot to generate a masked screenshot,
   compare the time-variant changes in the masked screenshot with the a plurality of patterns comprising images previously generated by the application;
   in response to the compare, render a difference between the masked screenshot and the plurality of patterns when the difference is below a threshold;
   determine whether there are version-specific changes on the screenshot;
   mask out the version-specific changes on the screenshot in response to a determination that there are version-specific changes; and
   hide background of the screenshot in response to a determination that there are no version-specific changes.

9. The apparatus of claim 8, wherein to mask, the processing device is to apply an ignore-bitmap mask to the screenshot.

10. The apparatus of claim 8, the processing device is to further apply a test stabilization to the application to cause the application to de-randomize data.

11. The apparatus of claim 8, wherein the application is non-deterministic, and the processing device is to further apply a test stabilization to the application to make the application determinable.

12. The apparatus of claim 8, the processing device is to further allow a user to accept the masked screenshot different from the plurality of patterns, and to add the masked screenshot to the plurality of patterns as a new pattern in response to the user accepting the masked screenshot.

13. The apparatus of claim 8, the processing device is to further present to a user the masked screenshot, a pattern of the plurality of patterns, and the difference between the masked screenshot and the pattern, and to replace the pattern with the masked screenshot in response to an instruction from the user.

14. The apparatus of claim 8 wherein the mask filters out a plurality of parts of each of the plurality of images.

15. A non-transitory computer-readable storage medium embodying instructions that, when executed by a processing device, cause the processing device to:
   generate, a screenshot of each of a plurality of images of a graphical user interface (GUI) of the application;
   mask, by the processing device, time variant changes in the screenshot to generate a masked screenshot;
   compare the time-variant changes in the masked screenshot with a plurality of patterns comprising images previously generated by the application;

in response to the compare, render a difference between the masked screenshot and the plurality of patterns when the difference is below a threshold;

determine whether there are version-specific changes on the screenshot;

mask out the version-specific changes on the screenshot in response to a determination that there are version-specific changes; and hide background of the screenshot in response to a determination that there are no version-specific changes.

16. The non-transitory computer-readable storage medium of claim 15, wherein to mask, the processing device is to:
apply an ignore-bitmap mask to the screenshot.

17. The non-transitory computer-readable storage medium of claim 15, wherein the processing device is further to:
apply a test stabilization to the application to cause the application to de-randomize data.

18. The non-transitory computer-readable storage medium of claim 15, wherein the application is non-deterministic, and the processing device is further to:
apply a test stabilization to make the application determinable.

19. The non-transitory computer-readable storage medium of claim 17, wherein the processing device is further to:
allow a user to accept the masked screenshot different from the plurality of patterns; and
add the masked screenshot to the plurality of patterns as a new pattern in response to the user accepting the masked screenshot.

20. The non-transitory computer-readable storage medium of claim 15, wherein the processing device is further to:
present to a user the masked screenshot, a pattern of the plurality of patterns, and the difference between the masked screenshot and the pattern; and
replace the pattern with the masked screenshot in response to an instruction from the user.

21. The non-transitory computer-readable storage medium of claim 15, wherein mask filters out a plurality of parts of each of the plurality of images.

* * * * *